Figure 1:
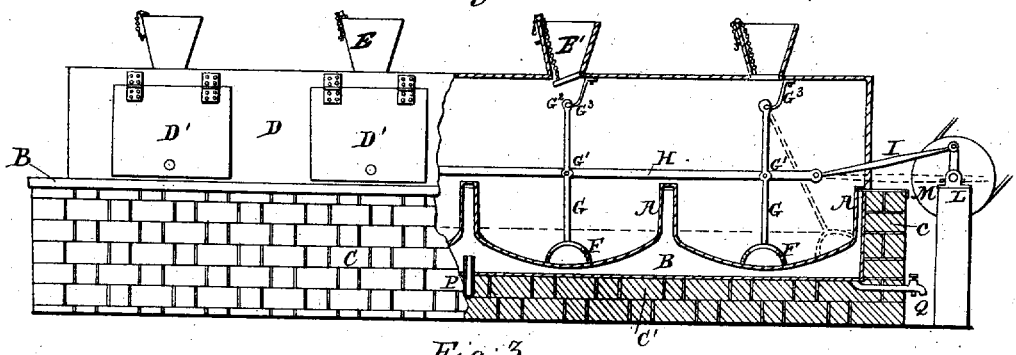

WYCKOFF & FELL.

Ore Amalgamator.

No. 1,169. Reissued April 9, 1861.

N. PETERS, Photo-Lithographer, Washington, D. C.

UNITED STATES PATENT OFFICE.

JOHN N. WYCKOFF, OF BROOKLYN, NEW YORK, AND THOMAS M. FELL, OF MELVILLE MINES, VIRGINIA.

IMPROVEMENT IN GOLD-AMALGAMATORS.

Specification forming part of Letters Patent No. 24,902, dated July 26, 1859; Reissue No. 1,169, dated April 9, 1861.

*To all whom it may concern:*

Be it known that we, JOHN N. WYCKOFF, of Brooklyn, in the county of Kings and State of New York, and THOMAS M. FELL, of Melville Mines, in the county of Orange and State of Virginia, have invented certain new and useful Improvements in the Reduction of Gold and Silver Ores; and we do hereby declare that the following is a full, clear, and exact description of the same.

The nature of our invention consists in a process by which the metals gold and silver can be more economically and effectually separated from their ores or the earthy matter in which they are found than has yet been done. This is effected by our particular method of amalgamating those metals with quicksilver in the manner hereinafter described.

The process of amalgamation for the separation of metals has long been known and practiced, but it has been very ineffectual in comparison with the peculiar method discovered by us, and especially for the following reasons:

It is well known that the process of amalgamation takes place rather sluggishly when the temperature of the metals used is at a very low point, but the more rapidly and effectually the higher that temperature is raised. There has, however, always been an insuperable objection to heating the mercury for this purpose, inasmuch as when its temperature is greatly increased over 60° or 70° Fahrenheit it is found to give off a vapor which is highly detrimental to the health of the workmen. We have discovered the means of remedying this difficulty in such a manner as to permit the temperature of the mercury to be raised to the boiling-point of water without producing any injurious consequences. But another and still more important difficulty has been overcome by us. To effect the desired amalgamation the particles of gold and silver must be brought into close contact with the mercury, especially when the latter is at a low degree of temperature. It is well known that the precious metals as found in the mine are to a great extent divided into such minute particles as to be wholly invisible to the naked eye, but making up in the immensity of their numbers what they lack in individual magnitude. When the materials in which they are embedded are ground and mingled with water, these particles are found to continue floating in the water instead of readily sinking down in contact with the mercury placed at the bottom of the vessel, and even those which finally subside fall upon the coarser particles of sand which settle more readily and cover the surface of the mercury so as to prevent the necessary contact. For these reasons it has been found impracticable to bring a very large portion of the gold and silver, which actually exists in the ground material into the necessary contact with the mercury, and it therefore passes off with the earthy matter, and is finally lost.

Now, we have discovered that when mercury and water are placed for a period of time in the same vessel, to the bottom of which vessel sufficient heat is applied to raise the whole to about the boiling-point of the water, or to a sufficient temperature to cause currents of circulation, although the mercury does not actually boil, it is much more thoroughly agitated than the water which is above it, and is thrown in minute particles throughout the entire mass. By these combined means not only does the mercury in myriads of small globules fly through the water and ore, but the natural laws of heated fluids cause all the floating gold or silver to ascend and descend with the currents of water, and thus dip into or come in close contact with the mercury. The period of time allowed for amalgamation (but which in practice must be entirely determined by the nature of the sample under treatment) is three-fourths of an hour, during which time the entire bulk of ore, water, and metals have been repeatedly in close contact with the mercury, the bulk of which remains at the bottom of the vessel.

We have further discovered that while mercury cannot be heated in the open air much higher than the ordinary temperature of the atmosphere without serious detriment to the health of those employed in managing it, still when placed under water the whole may be raised to 212° Fahrenheit without any deleterious consequences. The vapor of the mercury, which is then given off, is arrested by the water and does not pass off into the atmosphere.

Our invention consists in the application of these principles and discoveries to the separation of gold and silver from any substances with which they may at any time be found mingled or combined. It matters not how finely divided are the particles of the precious metals, or whether disseminated through earthy or rocky substances, as they are found in mines, or mingled with the sweepings of jewelers' shops, assay-offices, and the like, or with any other materials. When chemically combined with sulphur, and in some other cases, it will be found advisable and sometimes necessary to subject the whole to a thorough calcination, in order to afford the mercury full power to act upon the gold or silver. The use of an alkali to cleanse the surface of the mercury is also often found advantageous.

To enable others skilled in the art of separating gold and silver to make and use our invention, we will proceed to describe one of the particular methods by which we effect our purpose.

We construct an apparatus consisting of a series of pots or amalgamators having cylindrical bottoms, each sufficient to hold a charge, say, of fifty pounds, with the necessary amount of water and mercury. We use about the same amount in weight of mercury that we have in one charge of mineral. As a number of these amalgamators are desirable, they are arranged in sets or rows of convenient numbers, and for the purpose of being heated they are placed within a chamber or surrounded by an exterior casing, into which is introduced steam of more than 212°, whereby the water in these amalgamators is made to boil. We then charge each of these amalgamators with the proper amount of mineral, mercury, and water, which latter should be in sufficient quantity to allow of free motion among the particles of solid matter it contains. We then place in each of these amalgamators a small quantity of potash, soda, wood-ashes, or other substance containing free alkali, for the purpose of keeping the globules of mercury clean and bright. The whole is to be kept constantly stirred or mixed, in the manner hereinafter explained. The heat is then applied and the water made to boil for about the space of three-quarters of an hour, which in ordinary cases is deemed sufficient; but this must be varied to suit particular cases, to be determined by experiment. A quantity of cold water is then introduced into each of these amalgamators, which puts a stop to the boiling or to the circulation of currents, and in other ways enables the mercury with the gold or silver to which it is united to sink in bulk to the bottom of the vessel. Each change is succeeded by another until the mercury is found sufficiently rich to be removed from the vessel and separated from the precious metal in the ordinary way.

Figure 3:
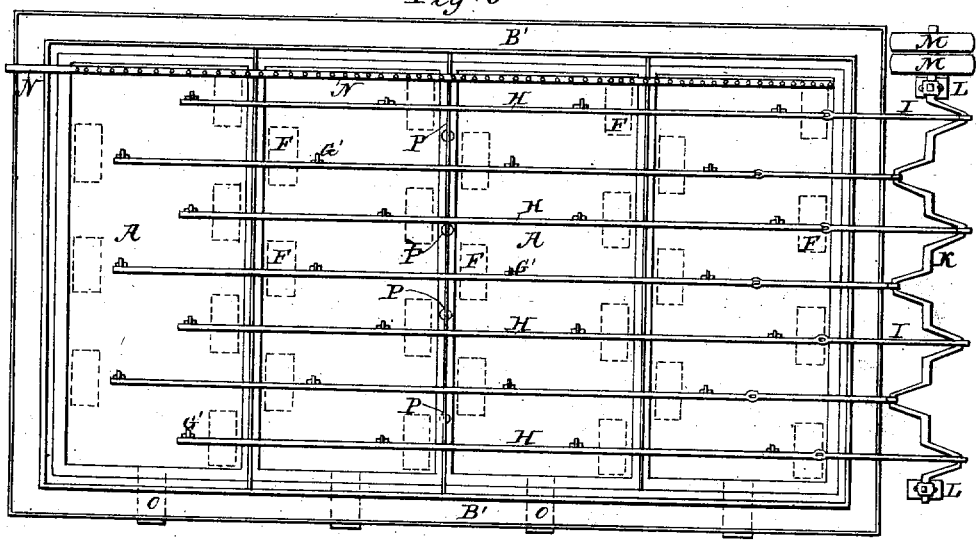
Figure 2:
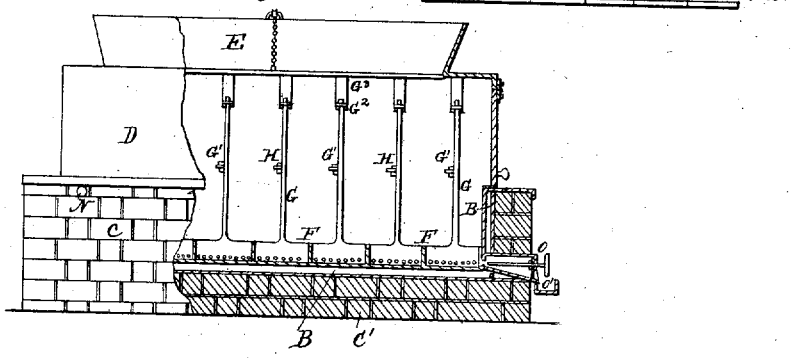

In the accompanying drawings, Figure 1 is the front elevation of an apparatus consisting of several of these amalgamators, which may be used for this purpose. Fig. 2 is a side elevation, and Fig. 3 is a plan.

A A are the vessels or amalgamators surrounded by the exterior casing, which forms the receptacle for the steam B.

D is a cover of wood with doors or slides D′.

E E are hoppers for introducing the charge, and F F are iron stirrers, made of one-quarter-inch plate bent and perforated with inch holes.

G G are iron pendulums connected at G′ to the rods H H, which are moved by the crank-shaft K.

N is a water-pipe perforated with holes in such a manner as to supply and distribute the necessary amount of water.

O, Fig. 2, is a discharge-valve.

P, Fig. 1, is the steam supply pipe, and Q the pipe for discharging the condensed water.

The mode of operation is evident from an examination of the apparatus, aided by the above description. In letting out the charge after it has been sufficiently boiled the water is allowed to run through the pipe N and out of the discharge-pipe O until it is clear, which usually requires about ten minutes.

It is obvious that the above-described apparatus or mode of amalgamation is susceptible of many modifications. For instance, the vessels or amalgamators may be heated by the direct application of fire; or they may be entirely surrounded by steam forming cylindrical and inclosed chambers. We, however, prefer the open vessels, as shown in the drawings, so far as our experiments have yet extended, on account of the greater convenience of working and discharging the same; or the use of superheated steam and various other modes of applying heat of different kinds may be resorted to.

For the purpose of stirring the contents of the amalgamators various contrivances may be used. But all these modes of heating and stirring are intended to be embraced in the patent for which we are now applying.

We do not confine ourselves to any of the exact details as herein described; but

What we claim as new, and desire to secure by Letters Patent, is—

The process of separating gold or silver from other substances by mixing the whole with water, confining it together with mercury within suitable containing-vessels, and thereby the action of heat commingling the mercury throughout the entire body of water and substances containing the precious metals, substantially as set forth.

JOHN N. WYCKOFF.
THOS. M. FELL.

Witnesses:

M. M. LIVINGSTON,
J. W. COOMBS.